(12) United States Patent
Ehrmann et al.

(10) Patent No.: US 10,774,731 B2
(45) Date of Patent: Sep. 15, 2020

(54) COMPRESSOR OF A TURBOCHARGER HAVING AN AIR RECIRCULATION VALVE AND TURBOCHARGER AND MOTOR VEHICLE HAVING SUCH A COMPRESSOR

(71) Applicant: Bayerische Motoren Werke Aktiengesellschaft, Munich (DE)

(72) Inventors: Stefan Ehrmann, Fichtenau (DE); Henrik Foerster, Uehlfeld (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 246 days.

(21) Appl. No.: 15/801,447

(22) Filed: Nov. 2, 2017

(65) Prior Publication Data
US 2018/0058309 A1     Mar. 1, 2018

Related U.S. Application Data

(63) Continuation of application No. PCT/EP2016/064367, filed on Jun. 22, 2016.

(30) Foreign Application Priority Data

Aug. 11, 2015 (DE) .................. 10 2015 215 246

(51) Int. Cl.
*F02B 37/16* (2006.01)
*F02M 35/10* (2006.01)
(Continued)

(52) U.S. Cl.
CPC ............ *F02B 37/166* (2013.01); *F02B 37/16* (2013.01); *F02M 35/10144* (2013.01);
(Continued)

(58) Field of Classification Search
CPC . F02B 37/16; F02B 37/166; F02M 35/10144; F02M 35/10209;
(Continued)

(56) References Cited

U.S. PATENT DOCUMENTS 2,656,096 A * 10/1953 Schwarz ............... F04D 29/441
                                                      415/58.4
3,741,677 A *  6/1973 Silvern .................. F04D 17/12
                                                      415/58.4
(Continued)

FOREIGN PATENT DOCUMENTS

CH           618 772 A5    8/1980
CN         103518048 A     1/2014
(Continued)

OTHER PUBLICATIONS

Chinese-language Office Action issued in counterpart Chinese Application No. 201680026431.2 dated Mar. 8, 2019 with English translation (15 pages).
(Continued)

*Primary Examiner* — Thai Ba Trieu
(74) *Attorney, Agent, or Firm* — Crowell & Moring LLP

(57) ABSTRACT

A compressor of a turbocharger is provided. The compression pipe of the compressor is connected to the intake pipe thereof by a return flow duct, in which an air recirculation valve is arranged for controlling the return flow of already compressed fresh air. The return flow duct opens into a groove of an intake manifold receptacle of the compressor, and at least one return flow opening adjoining the groove and facing an interior of the intake pipe is arranged on an intake manifold of the intake pipe.

13 Claims, 2 Drawing Sheets

(51) Int. Cl.
  *F04D 29/42* (2006.01)
  *F04D 29/68* (2006.01)
  *F04D 27/02* (2006.01)
  *F01D 17/14* (2006.01)
(52) U.S. Cl.
  CPC ... *F02M 35/10209* (2013.01); *F04D 27/0238* (2013.01); *F04D 29/4213* (2013.01); *F04D 29/684* (2013.01); *F01D 17/145* (2013.01); *F05D 2220/40* (2013.01); *Y02T 10/144* (2013.01)
(58) Field of Classification Search
  CPC ............ F04D 27/0238; F04D 29/4213; F04D 29/684; F01D 17/145; F05D 2220/40; Y02T 10/144
  USPC .................. 60/611, 605.1; 415/58.4–58.5
  See application file for complete search history.

(56) References Cited

U.S. PATENT DOCUMENTS

| | | | | |
|---|---|---|---|---|
| 4,517,803 | A * | 5/1985 | Jamison | F02B 37/16 60/611 |
| 4,696,165 | A * | 9/1987 | Bucher | F04D 27/0238 60/611 |
| 5,173,021 | A * | 12/1992 | Grainger | F02B 37/16 60/611 |
| 6,813,887 | B2 * | 11/2004 | Sumser | F02B 37/16 60/611 |
| 7,021,058 | B2 * | 4/2006 | Scheinert | F02B 29/0412 60/611 |
| 7,624,575 | B2 * | 12/2009 | Noelle | F04D 29/4213 60/605.1 |
| 7,685,819 | B2 * | 3/2010 | Vetrovec | F02B 29/0412 60/611 |
| 8,287,232 | B2 * | 10/2012 | Gu | F04D 27/0223 415/56.5 |
| 8,322,138 | B2 * | 12/2012 | Jackson | F04D 29/4213 60/605.1 |
| 9,243,550 | B2 * | 1/2016 | Miazgowicz | F02B 37/16 |
| 9,618,001 | B2 * | 4/2017 | Isogai | F04D 17/10 |
| 10,012,184 | B2 * | 7/2018 | Guidi | F02M 26/19 |
| 10,100,785 | B2 * | 10/2018 | McHenry | F04D 17/10 |
| 2005/0022526 | A1 | 2/2005 | Scheinert | |
| 2013/0045082 | A1 * | 2/2013 | Dellmann | F01D 9/06 415/58.4 |
| 2013/0152582 | A1 * | 6/2013 | Anschel | F01D 17/105 415/145 |
| 2014/0093354 | A1 | 4/2014 | Sekularac et al. | |
| 2014/0182287 | A1 | 7/2014 | Yeom et al. | |
| 2014/0334923 | A1 * | 11/2014 | Moss | F04D 29/4213 415/203 |
| 2015/0285257 | A1 * | 10/2015 | Anschel | F01D 9/026 415/144 |
| 2016/0131148 | A1 * | 5/2016 | Murayama | F04D 29/4213 415/58.4 |
| 2019/0264603 | A1 * | 8/2019 | Hiller | F04D 29/4213 |

FOREIGN PATENT DOCUMENTS

| | | | |
|---|---|---|---|
| CN | 103912364 A | 7/2014 | |
| DE | 3120739 A1 | 3/1982 | |
| DE | 103 21 572 A1 | 12/2004 | |
| DE | 11 2011 101 494 T5 | 2/2013 | |
| DE | 10 2014 215 850 A1 | 2/2016 | |
| DE | 10 2014 223 845 A1 | 5/2016 | |
| EP | 2615308 A1 * | 7/2013 | ........... F04D 29/464 |
| GB | 1 535 677 A | 12/1978 | |
| GB | 2 077 354 A | 12/1981 | |
| WO | WO 2008/070649 A1 | 6/2008 | |
| WO | WO-2015046036 A1 * | 4/2015 | ........ F04D 29/4213 |

OTHER PUBLICATIONS

German Search Report issued in counterpart German Application No. 10 2015 215 246.4 dated Apr. 21, 2016 with partial English-language translation (Thirteen (13) pages).

International Search Report (PCT/ISA/210) issued in PCT Application No. PCT/EP2016/064367 dated Sep. 30, 2016 with English-language translation (Five (5) pages).

German-language Written Opinion (PCT/ISA/237) issued in PCT Application No. PCT/EP2016/064367 dated Sep. 30, 2016 (Five (5) pages).

Chinese-language Office Action issued in Chinese Application No. 201680026431.2 dated Apr. 26, 2020 with English translation (18 pages).

* cited by examiner

COMPRESSOR OF A TURBOCHARGER HAVING AN AIR RECIRCULATION VALVE AND TURBOCHARGER AND MOTOR VEHICLE HAVING SUCH A COMPRESSOR

CROSS REFERENCE TO RELATED APPLICATIONS

This application is a continuation of PCT International Application No. PCT/EP2016/064367, filed Jun. 22, 2016, which claims priority under 35 U.S.C. § 119 from German Patent Application No. 10 2015 215 246.4, filed Aug. 11, 2015, the entire disclosures of which are herein expressly incorporated by reference.

BACKGROUND AND SUMMARY OF THE INVENTION

The invention relates to a compressor of a turbocharger, the compression pipe of which is connected to the intake pipe thereof via an overrun air recirculation valve, and to a turbocharger and a motor vehicle having a compressor of said type.

The diesel or Otto-cycle engine of numerous motor vehicles has a turbocharger, in which inducted fresh air is supplied under pressure to the combustion chamber by means of a compressor which is driven by the exhaust-gas flow, that is to say the injected fuel mixture is "supercharged". By means of the supercharging of the fuel mixture with pressurized fresh air—and the thus increased oxygen content—it is possible even at low engine speeds for a high torque to be provided by virtue of the combustion process being promoted.

In the case of some turbocharged engines, however, so-called "turbo lag" arises, which occurs if, after a release of the accelerator pedal, the accelerator pedal is quickly intensely depressed again. If, in the case of such compressors, the accelerator pedal is released, and thus the throttle flap is closed, in a sudden manner, a high dynamic pressure builds up downstream of the compressor, which cannot escape because the path to the intake pipe is closed by means of the throttle flap. The corresponding surging of the turbocharger gives rise to such an intense counterpressure at the compressor wheel that the latter is intensely braked.

If the driver then suddenly opens the throttle flap again by depressing the accelerator pedal again, the counterpressure immediately intensely drops. Nevertheless, the compressor wheel of the turbocharger has already been braked, such that a certain amount of time is required until the torque boosted by the turbocharger and expected by the driver is available again.

To avoid the surging of the turbocharger that is the cause of turbo-lag in overrun operation, it has in the meantime been the approach, in the compressor of many turbocharged engines, to install an overrun air recirculation valve (also referred to as overrun cut-off valve, pop-off valve or snifter valve), which can open up a return-flow duct between the compression pipe and the intake pipe of the turbocharger during overrun operation. With the fresh-air circuit thus formed, braking of the compressor wheel is avoided, such that, even in the case of the accelerator pedal being depressed again, the full charge pressure is available immediately.

In the case of such compressors, it has however been found that the ambient air flowing at high pressure through the return-flow duct, which ambient air has at least initially already been compressed, gives rise to disturbing flow noise when it enters the intake pipe again.

It is consequently the object of the present invention to provide a compressor of a turbocharger which exhibits less noise generation during overrun operation.

This and other objects are achieved according to the invention by a compressor of a turbocharger, the compression pipe of which is connected to the intake pipe thereof via a return-flow duct in which there is arranged an overrun air recirculation valve for controlling the return flow of already-compressed fresh air. Here, the return-flow duct opens into a groove of an intake connector receptacle of the compressor, and, on an intake connector of the intake pipe, there is arranged at least one return-flow opening, which adjoins the groove, to an interior space of the intake pipe.

The invention is based on the underlying concept whereby, during overrun operation, with the overrun air recirculation valve open, fresh air flowing back through the return-flow duct is firstly diverted and/or distributed before it can flow into the intake pipe. In interaction with the groove of the intake connector receptacle and the intake connector inserted therein, such a diversion and/or distribution may preferably occur at one or more return-flow openings which are arranged in the circumference at a location other than at the return-flow duct.

It is also possible to avoid a reduction in efficiency of the compressor, such as can arise, without the invention, at the inlet of the return-flow duct from turbulence on one side upstream of the compressor wheel and associated pressure losses and poor center values.

To optimize the distribution of the return flow of fresh air in the groove, the groove is, according to one refinement, arranged along the entire circumference of the intake connector receptacle. The groove is then preferably formed as a ring-shaped groove, preferably proceeding from an inner circumferential surface of the intake connector receptacle. Typically, a ring-shaped groove of said type is provided already in a casting mold of the compressor or of the turbocharger, though it may also be formed from a cylindrical or conical circumferential surface by a cutting procedure.

To ensure that the intake connector is received in the intake connector receptacle easily and in a simultaneously reliable manner, it is also possible, in an alternative embodiment, for the groove to be arranged only along a part of the circumference of the intake connector receptacle.

Undesired flow noise, as in the case of the known compressors mentioned in the introduction, is promoted in particular by an increased return flow, a relatively high pressure, a relatively high speed of the return flow, and/or by a small outlet cross section. To avoid this, in one refinement, the intake connector has, in particular in the region of the groove, more than one return-flow opening, in particular two, three or four. These are advantageously of such a size that they utilize the entire opening of the groove in the intake connector receptacle along a longitudinal axis of the compressor.

If multiple return-flow openings are provided, these are preferably arranged, with respect to the circumference of the intake connector, at locations with substantially the same pressure potential of the inducted fresh air during operation of the turbocharger. So-called "crosstalk", in the case of which air flows in the groove from a return-flow opening with relatively high pressure potential to a return-flow opening with relatively low pressure potential, can thus be avoided, along with the associated pressure losses.

To minimize swirling or turbulence when the return flow and the intake flow impinge on one another, in one refinement, the intake connector has a larger inner diameter in the region of the return-flow opening(s) than in a region which is situated adjacent along the axis of rotation of a compressor wheel of the compressor and which is remote from the compressor wheel.

This effect can be further intensified in that, in one refinement, the intake connector has a separation edge, in particular a flow separation edge, upstream of the return-flow opening with respect to a main intake direction in the intake pipe, by which separation edge the fresh-air flow is preferably diverted away from the delimitation of an inner cross section of the intake connector.

To extract kinetic energy from the return flow, the return-flow duct is arranged so as to be at least partially offset with respect to a return-flow opening, in particular circumferentially offset.

To permit simple and/or inexpensive production of the compressor, a return-flow opening is formed with a bore in a wall of the intake connector, or is provided already in a casting mold for producing the intake connector.

To make the convergence of the return flow and of the intake flow more expedient from a flow aspect, in particular less turbulent, a return-flow opening is, at least over a part of its radial extent, formed so as to be open toward a compressor-wheel-side face side of the intake connector.

According to a further aspect of the invention, a turbocharger is provided which has a compressor within the meaning of the invention. Likewise provided is a motor vehicle which has a turbocharger of said type.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
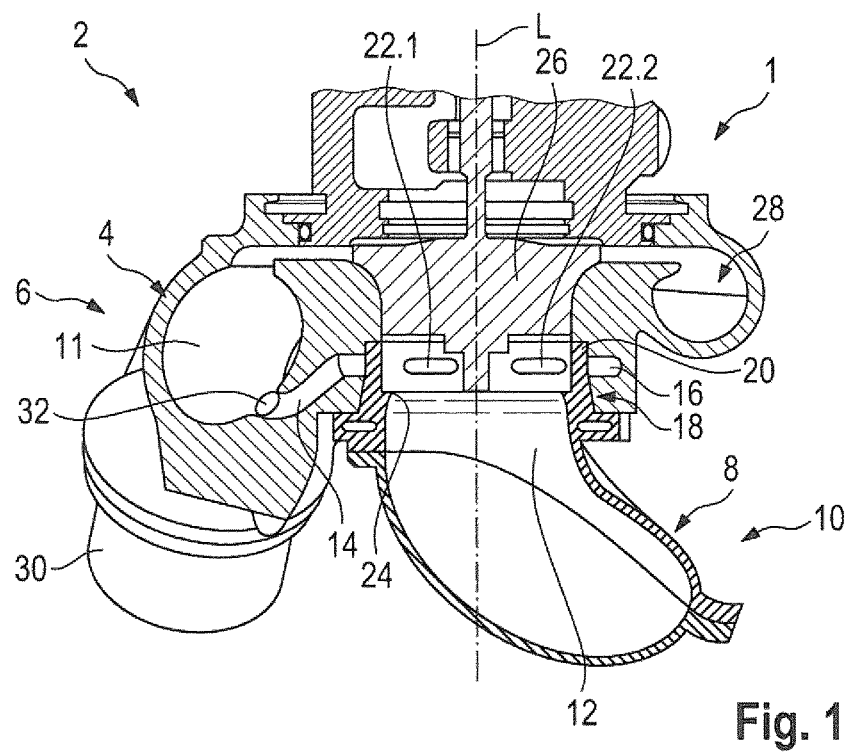
FIG. 1 shows a compressor as per a first embodiment of the invention in a partially schematic sectional view.

FIG. 1 shows the compressor 1 of a turbocharger 2 with the components of the turbocharger 2 surrounding the compressor 1, and with a part of a compression pipe 4 of a compression side 6 of the compressor 1 and a part of an intake pipe 8 of an intake side 10. Between an interior 11 of the compression pipe 4 and an interior 12 of the intake pipe 8 there is formed a return-flow duct 14 which opens into a groove 16 of an intake connector receptacle 18 of the compressor 1.

An intake connector 20 composed of a plastics material is received in the intake connector receptacle 18, which intake connector 20 has two return-flow openings 22.1 and 22.2 via which the groove 16 is connected to the interior 12 of the intake pipe 8. Furthermore, a separation edge 24 is arranged on an inner circumference of the intake connector 20.

Also arranged on the compressor 1 is an overrun air recirculation valve 30 with a valve flap 32 which, during compressor operation, seals off the interior 11 of the compression pipe 4 and the return-flow duct 14 with respect to one another in gas-tight fashion. The compressor 1 furthermore has a compressor wheel 26 which is mounted in the turbocharger 2 for rotation about the longitudinal axis L and which can be driven by a turbocharger wheel (not illustrated) in the exhaust-gas discharge line.

During operation of the turbocharger 2, fresh air is inducted into the interior 12 of the intake pipe 8 from the surroundings by the negative pressure generated by means of the compressor wheel, and the fresh air is introduced, having been compressed at the compressor wheel 26, that is to say at relatively high pressure, into the spiral 28 and from there into the interior 11 of the compression pipe 4.

When the throttle flap of the turbocharged engine (not illustrated) is closed, in order that a pressure high enough for undesired braking of the compressor wheel 26 does not form in the compression pipe 4 as a result of continuing compression via the compressor wheel 26, it is possible in overrun operation for the interior 11 of the compression pipe 4 to be short-circuited to the interior 12 of the intake pipe 8 via the return-flow duct 14 by operation of the overrun air recirculation valve 30. For this purpose, the valve element 32 is moved into an open operating position, in which it opens up the connection between the interior 11 of the compression pipe 4 and the return-flow duct 14.

Here, a fresh-air circuit is formed which runs from the intake connector 20 via the compressor wheel 26, the spiral 28, the compression pipe 4, the return-flow duct 14, the groove 16 and the return-flow openings 22.1 and 22.2 back to the intake connector 20.

The actuation of the overrun air recirculation valve 30 (or of the valve element 32 thereof) may be realized in a wide variety of ways known to a person skilled in the art, for example by coupling to the controller of the throttle flap or by actuation in a manner dependent on an absolute pressure value in the interior 11 of the compression pipe 4 or in a manner dependent on a pressure difference between the compression pipe 4 and the intake pipe 8.

If the valve element 32 is opened in the presence of an elevated pressure in the interior 11 of the compression pipe 4, already-compressed fresh air flows with high kinetic energy (corresponding to the large pressure difference between the intake pipe 8 and the compression pipe 4) into the groove 16 via the return-flow duct 14. The groove 16 is formed as a ring-shaped groove on an encircling circumferential section of the intake connector receptacle 18.

The return-flow openings 22.1 and 22.2 are arranged so as to be circumferentially offset with respect to the inlet point of the return-flow duct 14 into the groove 16, such that, in any case, a preferably turbulent diversion of the return flow occurs on an outer wall of the intake connector 20. The return flow can in this case be distributed in the groove 16 along the entire circumference of the intake connector receptacle 18 and subsequently emerge into the interior 12 of the intake pipe 8 at the return-flow openings 22.1 and 22.2, in particular with relatively low kinetic energy.

As a result, the return flows emerging from the return-flow openings 22.1 and 22.2 and the intake flow in the intake pipe to the compressor wheel impinge on one another with relatively low kinetic energy, such that reduced flow noise arises.

This quiet merging of the air flows is assisted by the separation edge 24 which is arranged on the intake connector 20 such that the intake-air flow is diverted radially inwardly in relation to the axis of rotation of the compressor wheel 26, such that a relatively small air flow prevails in the region of the return-flow openings 22.1 and 22.2 at the inner circumferential surface of the intake connector. This can also contribute to a reduction in noise.

Figure 2:
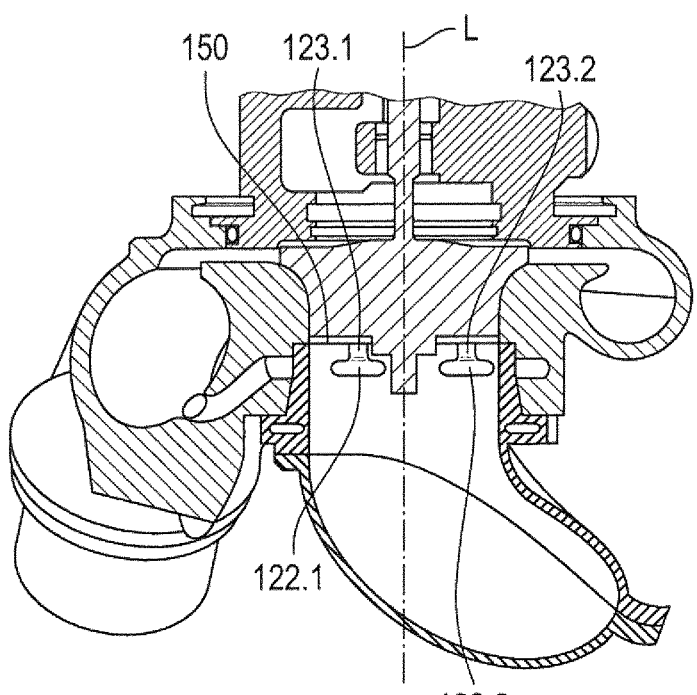
FIG. 2 shows a compressor as per a second embodiment of the invention in a partially schematic sectional view.

FIG. 2 shows a compressor 1 which differs from that of FIG. 1 in particular in that, instead of a separation edge 24 for assisting as quiet as possible a merging of the different air flows, it has return-flow openings 122.1 and 122.2 which, over at least a part of their radial extent, are formed so as to be open toward a compressor-wheel-side face side 150 of the intake connector 20, that is to say with corresponding openings 123.1 and 123.2 toward the face side 150.

Figure 3:
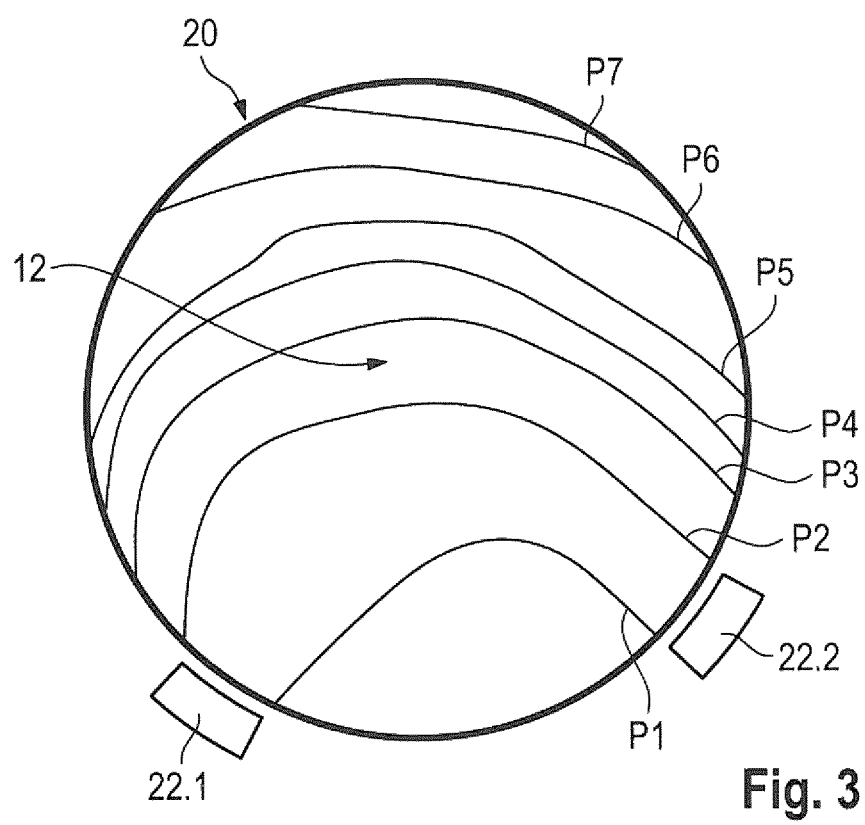
FIG. 3 shows the arrangement of two return-flow openings on the circumference of the intake connector in a manner dependent on the pressure conditions in the intake pipe in a schematic view.

FIG. 3 schematically shows a cross section through the intake connector 20. The lines P1 to P7 represent different isobars in the pressure profile of the air intake flow in the interior 12 of the intake pipe 8 at the level of the return-flow openings 22.1 and 22.2. Two adjacent isobar lines P, for example P1 and P2, indicate in each case a region of similar or substantially equal pressure in the intake pipe 8.

In the embodiments of the compressor 1 as per FIG. 1 or FIG. 2, the return-flow openings 22.1 and 22.2 are arranged in such a region of similar or substantially equal pressure. In this way, crosstalk between the two openings 22.1 and 22.2, in the case of which air would flow into the ring-shaped groove 16 at one opening 22.1 or 22.2 and out again at the other opening 22.2 or 22.1 with relatively low pressure potential, can be prevented, along with associated pressure losses upstream of the compressor wheel.

By means of a corresponding configuration of the intake geometry, it is self-evidently also possible, in an exemplary embodiment which is not illustrated, for an intake connector with more than two return-flow openings to be installed, if all return-flow openings have substantially the same pressure potential.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A compressor of a turbocharger, comprising:
a compression pipe;
an intake pipe;
a return-flow duct connecting the compression pipe and the intake pipe, wherein a compression pipe end of the return flow duct is located in a compressor housing at a compressor wheel end of the compression pipe, and the return duct is configured to conduct return flow of already-compressed fresh air from the compression pipe to a location in the intake pipe upstream of an inlet end of the compressor wheel; and
an overrun air recirculation valve arranged in the return-flow duct that controls the return flow of the already-compressed fresh air from the compression pipe to a location in the intake pipe, wherein
the return-flow duct opens into a groove of an intake connector receptacle of the compressor, the intake connector receptacle being configured to receive an intake connector at a location in the intake pipe radially inward of the groove, and
the groove is configured to pass the return flow radially inward through at least one return-flow opening in the intake connector to an interior space of the intake pipe upstream of the inlet end of the compressor wheel.

2. The compressor as claimed in claim 1, wherein the groove is arranged along an entire circumference of the intake connector receptacle.

3. The compressor as claimed in claim 1, wherein the groove is formed as a ring-shaped groove proceeding from an inner circumferential surface of the intake connector receptacle.

4. The compressor as claimed in claim 1, wherein the groove is arranged along a part of a circumference of the intake connector receptacle.

5. The compressor as claimed in claim 1, wherein the at least one return-flow opening includes a plurality of the return-flow openings positioned in the intake connector.

6. The compressor as claimed in claim 5, wherein the plurality of the return-flow openings are arranged in a circumference of the intake connector at locations with a same pressure potential of inducted fresh air during operation of the turbocharger.

7. The compressor as claimed in claim 1, wherein the intake connector has a larger inner diameter in the region of the return-flow opening than in an adjacent region along an axis of rotation of the compressor wheel of the compressor which is remote from the compressor wheel.

8. The compressor as claimed in claim 1, wherein the intake connector has a separation edge upstream of the return-flow opening with respect to a main intake direction in the intake pipe.

9. The compressor as claimed in claim 1, wherein the return-flow duct is arranged at least partially offset with respect to a return-flow opening.

10. The compressor as claimed in claim 1, wherein the return-flow opening is a bore in a wall of the intake connector.

11. The compressor as claimed in claim 1, wherein the return-flow opening is, at least over a part of its radial extent, formed so as to be open toward a compressor-wheel-side face side of the intake connector.

12. A turbocharger, comprising:
a compressor having
a compression pipe;
an intake pipe;
a return-flow duct connecting the compression pipe and the intake pipe, a compression pipe end of the return flow duct being located in a compressor housing at a compressor wheel end of the compression pipe, and the return duct is configured to conduct return flow of already-compressed fresh aft from the compression pipe to a location in the intake pipe upstream of an inlet end of the compressor wheel; and
an overrun air recirculation valve arranged in the return-flow duct that controls return flow of the already-compressed fresh air from the compression pipe to a location in the intake pipe, wherein
the return-flow duct opens into a groove of an intake connector receptacle of the compressor, the intake connector receptacle being configured to receive an intake connector at a location in the intake pipe radially inward of the groove, and
the groove is configured to pass the return flow radially inward through at least one return-flow opening in the intake connector to an interior space of the intake pipe upstream of the inlet end of the compressor wheel.

13. A motor vehicle, comprising:
a turbocharger having a compressor, the compressor having
a compression pipe;
an intake pipe;
a return-How duct connecting the compression pipe and the intake pipe, wherein a compression pipe end of the return flow duct is located in a compressor housing at a compressor wheel end of the compression pipe, and the return duct is configured to conduct return flow of already-compressed fresh air from the compression pipe to a location in the intake pipe upstream of an inlet end of the compressor wheel; and
an overrun air recirculation valve arranged in the return-flow duct that controls the return flow of the already-compressed fresh aft from the compression pipe to a location in the intake pipe, wherein
the return-flow duct opens into a groove of an intake connector receptacle of the compressor, the intake connector receptacle being configured to receive an intake connector at a location in the intake pipe radially inward of the groove, and
the groove is configured to pass the return flow radially inward through at least one return-flow opening in the intake connector to an interior space of the intake pipe at upstream of the inlet end of the compressor wheel.

* * * * *